(12) United States Patent
Oh et al.

(10) Patent No.: US 10,673,523 B2
(45) Date of Patent: Jun. 2, 2020

(54) BANDWIDTH CONTROL METHOD AND APPARATUS FOR SOLVING SERVICE QUALITY DEGRADATION CAUSED BY TRAFFIC OVERHEAD IN SDN-BASED COMMUNICATION NODE

(71) Applicant: ELECTRONICS AND TELECOMMUNICATIONS RESEARCH INSTITUTE, Daejeon (KR)

(72) Inventors: Jung Yeol Oh, Sejong-si (KR); Kwang Ok Kim, Jeonju-si (KR); Kyeong Hwan Doo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 24 days.

(21) Appl. No.: 16/140,966

(22) Filed: Sep. 25, 2018

(65) Prior Publication Data

US 2019/0349081 A1 Nov. 14, 2019

(30) Foreign Application Priority Data

May 11, 2018 (KR) ........................ 10-2018-0054221

(51) Int. Cl.
*H04B 10/079* (2013.01)
*H04B 10/27* (2013.01)
*H04L 12/24* (2006.01)

(52) U.S. Cl.
CPC ......... *H04B 10/0795* (2013.01); *H04B 10/27* (2013.01); *H04L 41/0896* (2013.01); *H04L 41/20* (2013.01); *H04L 41/5003* (2013.01)

(58) Field of Classification Search
CPC . H04B 10/0795; H04B 10/27; H04L 41/0896; H04L 41/20; H04L 41/5003
See application file for complete search history.

(56) References Cited

U.S. PATENT DOCUMENTS 8,078,057 B2 12/2011 Wang
2006/0120282 A1* 6/2006 Carlson ............... H04L 12/2801
370/229

(Continued)

FOREIGN PATENT DOCUMENTS

KR 10-1589553 B1 1/2016
KR 10-2016-0052518 A 5/2016

(Continued)

*Primary Examiner* — Mina M Shalaby
(74) *Attorney, Agent, or Firm* — LRK Patent Law Firm

(57) ABSTRACT

A traffic control method and apparatus for solving service quality degradation caused by traffic overhead in a specific node, on which traffic is concentrated in the specific node because of traffic congestion in a software defined network (SDN) environment. A traffic control method to be performed by an SDN controller of an SDN environment includes: collecting real-time traffic state information of a network; detecting traffic overhead of at least one node on the basis of the collected real-time traffic state information; determining whether network resources are available to the at least one node where the traffic overhead is detected; and changing a service level agreement (SLA)-based bandwidth allowable capacity with regard to the at least one node in accordance with available network resources.

20 Claims, 10 Drawing Sheets

(56) References Cited

U.S. PATENT DOCUMENTS

| | | | |
|---|---|---|---|
| 2010/0153960 A1* | 6/2010 | Youn | G06F 9/5061 718/104 |
| 2011/0235592 A1* | 9/2011 | Hoefel | H04L 67/42 370/329 |
| 2012/0224495 A1* | 9/2012 | Lafleur | H04L 43/10 370/248 |
| 2015/0207677 A1* | 7/2015 | Choudhury | H04L 41/0806 370/254 |
| 2015/0215914 A1 | 7/2015 | Cho et al. | |
| 2016/0036704 A1* | 2/2016 | Xiao | H04L 47/2416 370/237 |
| 2016/0182344 A1* | 6/2016 | Subhedar | H04L 1/24 370/241.1 |
| 2016/0182345 A1 | 6/2016 | Herdrich et al. | |
| 2016/0261507 A1 | 9/2016 | Kwak et al. | |
| 2016/0380807 A1* | 12/2016 | Shevenell | H04L 41/082 370/252 |
| 2016/0380831 A1* | 12/2016 | Shevenell | H04L 41/0816 370/254 |
| 2017/0331703 A1* | 11/2017 | Sui | H04L 29/06 |
| 2018/0006893 A1* | 1/2018 | Iovanna | H04L 41/0896 |
| 2018/0091369 A1* | 3/2018 | Cunningham | H04L 43/0888 |
| 2018/0152958 A1* | 5/2018 | Arnold | H04L 41/5009 |
| 2018/0270118 A1* | 9/2018 | Lee | H04L 41/0896 |
| 2019/0036780 A1* | 1/2019 | Evans | H04L 41/0893 |
| 2019/0036816 A1* | 1/2019 | Evans | H04L 43/08 |
| 2019/0138948 A1* | 5/2019 | Janulewicz | H04W 24/02 |
| 2019/0306598 A1* | 10/2019 | Wen | H04B 10/27 |
| 2019/0379609 A1* | 12/2019 | Senarath | H04L 67/1074 |

FOREIGN PATENT DOCUMENTS

| | | |
|---|---|---|
| KR | 10-1661743 B1 | 10/2016 |
| KR | 10-2017-0033179 A | 3/2017 |
| KR | 10-2017-0065166 A | 6/2017 |
| WO | 2016/092851 A1 | 6/2016 |

* cited by examiner

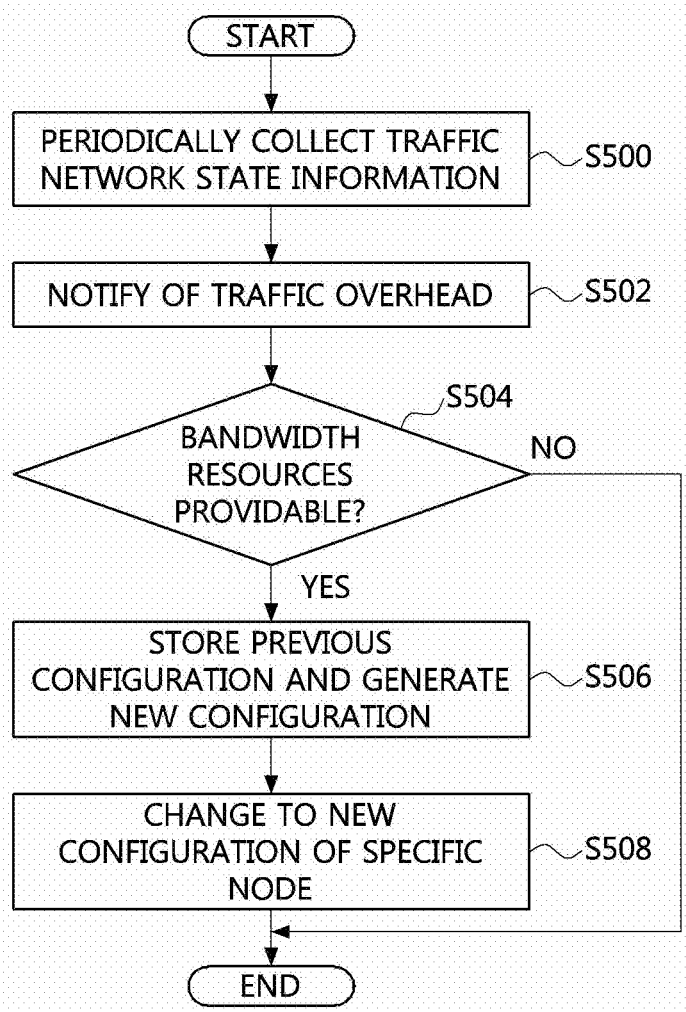

BANDWIDTH CONTROL METHOD AND APPARATUS FOR SOLVING SERVICE QUALITY DEGRADATION CAUSED BY TRAFFIC OVERHEAD IN SDN-BASED COMMUNICATION NODE

CROSS REFERENCE TO RELATED APPLICATION

This application claims priority to Korean Patent Application No. 10-2018-0054221, filed May 11, 2018 in the Korean Intellectual Property Office (KIPO), the entire content of which is hereby incorporated by reference.

BACKGROUND

1. Technical Field

Example embodiments of the present invention relate in general to a traffic control method and apparatus for solving service quality degradation caused by traffic overhead in a software defined network (SDN)-based communication node, and more specifically to technology for controlling network resources of a communication node having traffic overhead by a traffic control algorithm to solve service quality degradation without having an effect on a total network capacity and network quality of other communication nodes when the traffic overhead is occurred by exceeding a traffic reference of a service level agreement (SLA) in the SDN-based communication node.

2. Description of Related Art

A software defined network (SDN) refers to the next generation networking technology for easily setting, controlling and managing a network path through software programming.

The SDN divides a network into a data plane and a control plane and provides a standardized interface between the two planes so that a network manager can variously control a communication function implemented in the data plane by programming the control plane in accordance with different situations.

Meanwhile, in designing a conventional network, applicable traffic capacity is first estimated, and then the network is designed to have sufficient traffic capacity to handle a load of estimated peak traffic and network device operates within a range that does not exceed the designed traffic capacity. In general, a service level agreement (SLA) is defined for distributing network resources. The SLA limits a bandwidth of an individual node according to a contract with a communication service provider.

Due to recent increase in traffic proportion and freely movable traffic characteristics of a mobile network, momentary traffic concentration occurs in a specific node. The traffic concentration refers to a phenomenon wherein traffic is momentarily concentrated on a specific area without changing a total traffic capacity of the network. When such a traffic concentration phenomenon causes the traffic to be concentrated on a specific node and therefore a traffic volume assigned to the specific node exceeds a SLA reference defined in each communication node, a packet of the corresponding node is buffered as much as the excess and then discarded. A traffic congestion caused by the excess over the SLA reference considerably degrades service quality in the corresponding node to which a user has an access. Therefore, when a traffic congestion is caused by a momentary traffic concentration phenomenon, it is required to minimize service quality degradation caused by the excess over the traffic reference and enhance an efficiency of operating the whole network by analyzing a traffic status of the whole network and flexibly changing a traffic allowance in a concentration node through adaptive network management.

SUMMARY

Accordingly, example embodiments of the present invention are provided to substantially obviate one or more problems due to limitations and disadvantages of the related art.

Example embodiments of the present invention provide a traffic control method performed by a software defined network (SDN) controller in an SDN environment.

The traffic control method to be performed by a software defined network (SDN) controller of an SDN environment may comprise collecting real-time traffic state information of a network, detecting traffic overhead of at least one node on the basis of the collected real-time traffic state information, determining whether network resources are available to the at least one node where the traffic overhead is detected and changing a service level agreement (SLA)-based bandwidth allowable capacity with regard to the at least one node in accordance with available network resources.

The collecting of the real-time traffic state information may comprise collecting the real-time traffic state information from a passive optical network (PON)-based agent terminal (optical line terminal, OLT).

The detecting of the traffic overhead may comprise obtaining network state information based on the real-time traffic state information and detecting traffic overhead with regard to the at least one node by using the network state information.

The network state information may comprise at least one of a traffic throughput, a delay time, a delay jitter, and a packet drop rate.

The detecting of the traffic overhead may comprise classifying service classes in accordance with traffic characteristics required for the at least one node, setting a reference for the network state information adaptively in accordance with the classified service classes and detecting traffic overhead with regard to the at least one node on the basis of the set reference.

The traffic control method may further comprise, after the changing of the bandwidth allowable capacity, periodically monitoring a traffic throughput of each node included in the network and determining insufficiency in a total resource capacity of the network and restoring a bandwidth allowable capacity of the at least one node to a state just before the change, when it is determined that the total resource capacity of the network is insufficient.

When the at least one node comprises a plurality of nodes and the network resources are available to some nodes among the plurality of nodes in determining whether the network resources are available to the at least one node, the changing of the bandwidth allowable capacity may comprise selecting nodes having higher traffic overhead among the plurality of nodes and changing the SLA-based bandwidth allowable capacity with regard to the selected nodes.

The changing of the bandwidth allowable capacity may comprise increasing the bandwidth allowable capacity stepwise by as much as a preset increment in accordance with the number of changing times.

The traffic control method may further comprise, after the changing of the bandwidth allowable capacity, determining whether traffic overhead in the at least one node is solved; and changing the bandwidth allowable capacity of the at least one node into an initial set value when it is determined that the traffic overhead is resolved.

The determining of whether the traffic overhead is solved may comprise making the determination based on at least one of an average traffic throughput, an average packet drop, an average packet delay time, and an average packet delay jitter in the at least one node.

Example embodiments of the present invention also provide an software defined network (SDN) controller for controlling traffic in an SDN environment.

The SDN controller may comprise at least one processor and a memory configured to store instructions for instructing the at least one processor to perform at least one operation.

The at least one operation may comprise collecting real-time traffic state information of a network, detecting traffic overhead of at least one node on the basis of the collected real-time traffic state information, determining whether network resources are available to the at least one node where the traffic overhead is detected and changing an SLA-based bandwidth allowable capacity with regard to the at least one node in accordance with available network resources.

The collecting of the real-time traffic state information may comprise collecting the real-time traffic state information from a passive optical network (PON)-based agent terminal (optical line terminal, OLT).

The detecting of the traffic overhead may comprise obtaining network state information based on the real-time traffic state information and detecting traffic overhead with regard to the at least one node by using the network state information.

The network state information comprises at least one of a traffic throughput, a delay time, a delay jitter, and a packet drop rate.

The detecting of the traffic overhead may comprise classifying service classes in accordance with traffic characteristics required for the at least one node, setting a reference for the network state information adaptively in accordance with the classified service classes and detecting traffic overhead with regard to the at least one node on the basis of the set reference.

After the changing of the bandwidth allowable capacity, the at least one operation may further comprise periodically monitoring a traffic throughput of each node included in the network and determining insufficiency in a total resource capacity of the network and restoring a bandwidth allowable capacity of the at least one node to a state just before the change, when it is determined that the total resource capacity of the network is insufficient.

When the at least one node comprises a plurality of nodes and the network resources are available to some nodes among the plurality of nodes in determining whether the network resources are available to the at least one node, the changing of the bandwidth allowable capacity may comprise selecting nodes having higher traffic overhead among the plurality of nodes and changing the SLA-based bandwidth allowable capacity with regard to the selected nodes.

The changing of the bandwidth allowable capacity may comprise increasing the bandwidth allowable capacity stepwise by as much as a preset increment in accordance with the number of changing times.

After the changing of the bandwidth allowable capacity, the at least one operation may further comprise determining whether traffic overhead in the at least one node is solved and changing the bandwidth allowable capacity of the at least one node into an initial set value when it is determined that the traffic overhead is resolved.

The determining of whether the traffic overhead is resolved may comprise making the determination based on at least one of an average traffic throughput, an average packet drop, an average packet delay time, and an average packet delay jitter in the at least one node.

BRIEF DESCRIPTION OF DRAWINGS

Example embodiments of the present invention will become more apparent by describing example embodiments of the present invention in detail with reference to the accompanying drawings, in which:

FIG. 5 is a basic flowchart of a traffic control method of solving service quality degradation caused by traffic overhead of a specific node in an SDN environment according to one embodiment of the present invention;

DETAILED DESCRIPTION OF EXAMPLE EMBODIMENTS

Figure 1:
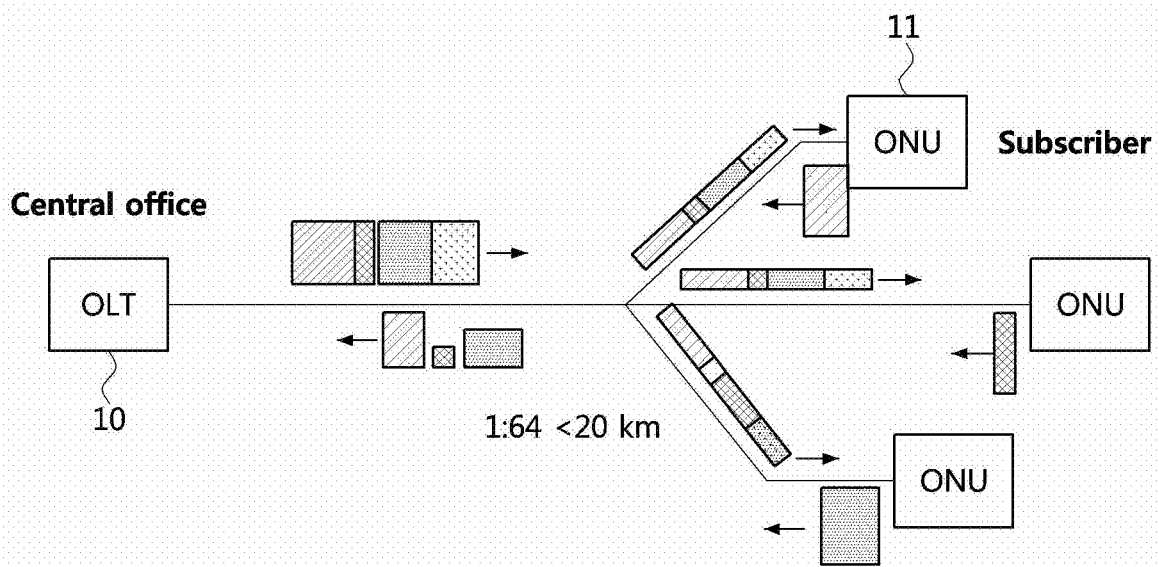
FIG. 1 is a conceptual diagram for describing an optical access network to which a traffic control method is applicable so as to solve service quality degradation caused by a momentary traffic concentration phenomenon in a software defined network (SDN) environment according to one embodiment of the present invention.

Example embodiments of the present invention are disclosed herein. However, specific structural and functional details disclosed herein are merely representative for purposes of describing the example embodiments of the present invention, however, the example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms ""a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a conceptual diagram for describing an optical access network to which a traffic control method is applicable so as to solve service quality degradation caused by a momentary traffic concentration phenomenon in an software defined network (SDN) environment according to one embodiment of the present invention.

A passive optical network (referred to as a PON or an optical access network) connects an optical line terminal (OLT) and a plurality of optical network units (ONU) through a point-to-multipoint (P2MP) distribution network, thereby providing a high-speed data service.

Referring to FIG. 1, the optical access network has a tree structure in which an OLT 10 located at a central office corresponds to many ONUs 11 located at a communication subscriber in a ratio of 1:N (e.g., 1:64 in FIG. 1 by way of example). A downstream packet from the OLT 10 to the ONU 11 may be transmitted by a broadcasting method, and an upstream packet from the ONU 11 to the OLT 10 may be transmitted by a time division multiple access (TDMA) method to avoid collision between many ONUs 11. Therefore, the packet can be transmitted via a passive device from the plurality of ONUS 11 to the OLT 10 without collision through one optical fiber according to a TDMA-based upstream data transmission protocol.

Here, the OLT 10 sets a service level agreement (SLA)-based bandwidth limit for the upstream transmission to prevent a specific ONU 11 from occupying the whole bandwidth. An SLA refers to a method, which is set according to a contract with a communication service provider and allows a network manager to directly adjust the bandwidth of the ONU 11 in accordance with a purpose of use, of preventing data greater than a set bandwidth reference from being transmitted. More specifically, the OLT 10 grants upstream time resources to each ONU 11 in accordance with the bandwidth reference set by the SLA based on report information received from different ONUS 11, and each ONU 11 transmits a packet stored in a buffer to the OLT 10 during a granted time window. If one ONU 11 is granted authority to transmit the entire buffer content by single transmission when the OLT 10 determines the transmission bandwidth of each ONU 11 for the upstream transmission, the ONU 11 having a large amount of data may occupy the whole bandwidth. To avoid such a situation, the OLT 10 may limit the maximum size of a transmission window. Therefore, all the ONUs 11 can transmit as much data (byte) as is self-requested (byte) without exceeding the maximum transmission window.

In general, an SLA reference may have the maximum bandwidth and the minimum bandwidth. The maximum bandwidth refers to a bandwidth of a maximal range allowable for a given node when the traffic volume of other nodes in the network is low. The minimum bandwidth refers to a minimal bandwidth ensured to be offered to the node. Dynamic bandwidth allocation (DBA), which refers to a mechanism of dynamically managing an upstream bandwidth on the PON shared among many ONUs 11, dynamically setting the granted bandwidth on the basis of the buffer state, the current transmission speed and the priority of the ONU 11 within a range between the minimum bandwidth and the maximum bandwidth of the SLA, thereby flexibly managing the traffic in accordance with a situation of the whole network.

Meanwhile, the quality of network service experienced by a user is related to a total throughput and time taken in transmitting data needed for the current application. Traffic for the internet and the network may be broadly classified into elastic traffic and inelastic traffic.

Here, the elastic traffic refers to traffic can adjust to changes in delay and throughput over wide ranges across an internet and still meet the needs of its applications. In general, applications for the elastic traffics are a transmission control protocol (TCP) or a user datagram protocol (UDP) packet based on a transmission layer protocol. In case of the elastic traffic, the delay time does not generally make a serious problem in terms of network management unless congestion is caused by network failure.

On the other hand, the inelastic traffic may be degraded in performance because it does not easily adapt to changes in delay and throughput. As an example of the inelastic traffic, there are multimedia transmissions such as audio transmission, video transmission or the like; and large-scale interactive traffic such as an interactive simulation application (e.g., a real-time game) or the like. In the inelastic traffic required to be processed in real time, not only the throughput and the delay time but also a timing problem has to be seriously taken into account. In most cases, there is a requirement of transmitting data at a constant speed equal to a transmission speed. For example, in the case of Request for Comments (RFC) 4594, an audio application has requirements that a one-way delay time should not exceed 150 ms, a one-way maximal jitter should not exceed 30 ms, a maximal jitter per hop should not exceed 10 ms, and a packet drop should not exceed 1%. The increase of the packet delay time due to network congestion causes a network failure and the quality of service (QoS) and the quality of experience (QoE) of the inelastic traffic are greatly degraded. Therefore, when the traffic, in particular, the inelastic traffic is concentrated on the specific node, it may cause a more serious problem than that of the elastic traffic.

Figure 2:
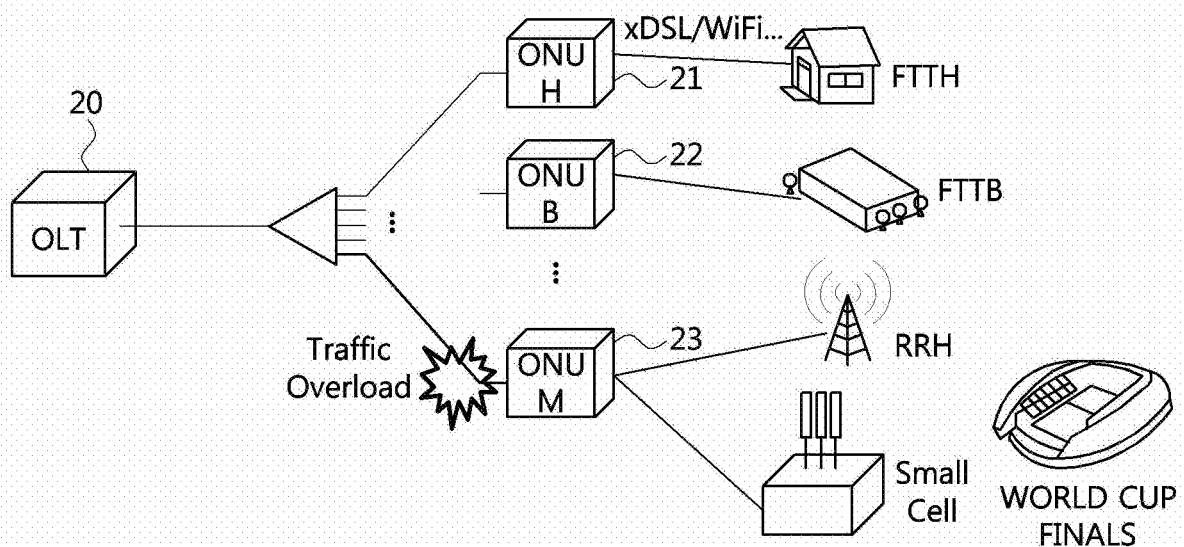
FIG. 2 is a diagram for describing an example of traffic overhead of a specific node caused by traffic concentration in an SDN environment according to one embodiment of the present invention.

FIG. 2 is a diagram for describing an example of traffic overhead of a specific node caused by traffic concentration in an SDN environment according to one embodiment of the present invention.

Traffic on a network is movable according to time and places. Due to the traffic concentration phenomenon wherein the traffic flexibly moves according to time and is momentarily focused on a specific place without greatly changing a total traffic capacity of the network, the traffic concentration may occur in a specific node and thus cause a serious network congestion.

Referring to FIG. 2, three kinds of nodes including a home (ONU H) node 21, a business (ONU B) node 22, and a mobile (ONU M) node 23, which are interworking with one OLT 20, may operate on a PON. When many people are concentrated on the ONU M node 23 due to the World Cup Finals or a similar important game being held at a certain time, mobile network data floods into the ONU M node 23 and thus congestion is caused and makes many users dissatisfied with network service quality.

In such a particular case, rather than a problem caused by a rapid increase in traffic, the traffic is acceptable from the viewpoint of the total traffic capacity, it means that the service quality is degraded due to the network congestion caused by the traffic concentrated on a specific node.

Conventionally, it is highly difficult to change configurations one by one according to dynamically changing network conditions because a network manager has to make manual inputs for setting the network. However, it may be possible to flexibly and efficiently manage the network by applying SDN technology to the optical access network so that network intelligence can be focused on an SDN controller, and a global view of the whole network state can be provided through abstraction of service. For example, an SDN-based optical access network system dynamically generates a new configuration according to network situations and reflects a new corresponding policy to the network, thereby achieving smart network management adaptive to real-time network situations.

Below, a system used to solve a problem of service quality degradation caused by traffic concentration on a specific node due to a momentary traffic congestion through intellectual SLA management according to real-time network situations in the SDN-based network (in particular, optical access network) will be described.

Figure 3:
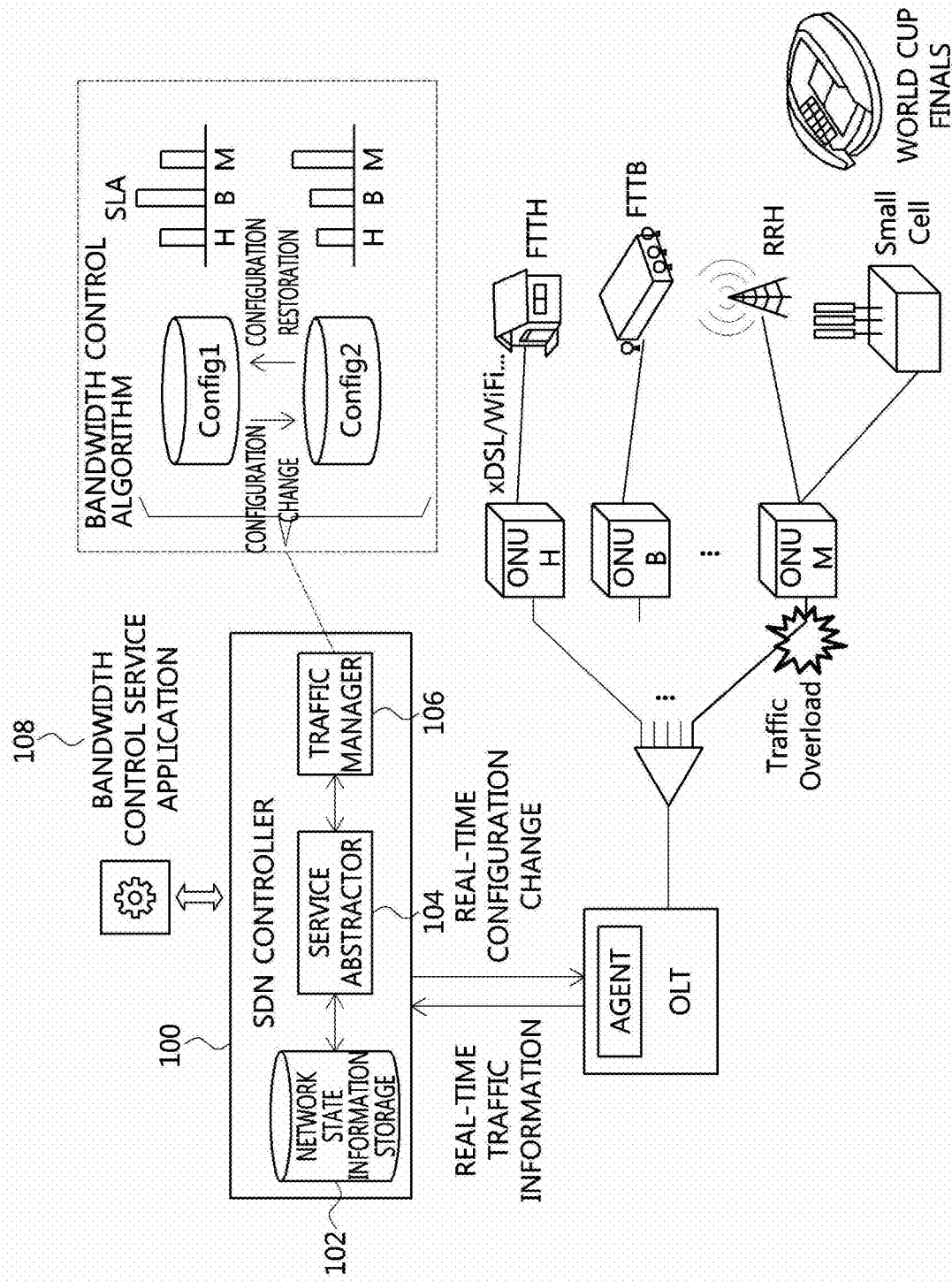
FIG. 3 is a conceptual diagram for describing a traffic control method of solving service quality degradation caused by traffic overhead of a specific node in an SDN environment according to one embodiment of the present invention.

FIG. 3 is a conceptual diagram for describing a traffic control method of solving service quality degradation caused by traffic overhead of a specific node in an SDN environment according to one embodiment of the present invention.

Referring to FIG. 3, the traffic control method of solving service quality degradation caused by traffic overhead of a specific node in an SDN environment according to one embodiment of the present invention may be performed by an SDN controller 100.

Here, the SDN controller 100 receives real-time traffic information from an agent on a network (e.g., an OLT in the case of an optical network), processes the received real-time traffic information to generate the network state information or collects the network state information from the agent, and determines whether traffic overhead occurs in a specific node based on the obtained real-time traffic information or network state information. In this case, when it is determined that the specific node has the traffic overhead (or congestion), the SDN controller 100 may generate a new network configuration based on a bandwidth control algorithm and control the agent to apply the generated network configuration Config 2 instead of the currently applied network configuration Config 1. In this case, the SDN controller 100 may include a network state information storage 102 for storing network state information when elements are defined according to functions, a traffic manager 106 for generating, modifying and restoring a network configuration in accordance with the bandwidth control algorithm, and a service abstractor 104 for abstracting a network service, including hardware, of controlling the network and a management interface provided to the hardware and supporting software-based network control to be implemented.

Specifically, the SDN controller 100 may use at least one among a traffic throughput, a delay time, a delay jitter, and a packet drop rate as the network state information for analyzing an upstream traffic state. Here, the traffic throughput may refer to an average traffic throughput transmission speed according to time; the delay time may refer to time taken from packet transmission to packet reception; the delay jitter may refer to a standard deviation value of a delay time; and the packet drop rate may refer to the amount of packet which is not transmitted and instead is lost in the buffer. In this case, the traffic throughput may be employed as an index for determining how much a corresponding node occupies the resources of the network.

Here, various methods may be used to acquire the network state information. For example, the traffic throughput may be obtained by calculating the number of bits transmitted in a certain period of time and averaging the calculated values corresponding to the certain period of time. The delay time may be obtained by recording a time stamp at packet transmission in a packet, checking a value of the time stamp at packet reception, and calculating a time of delay made during the packet transmission. The delay jitter may be calculated by analyzing the delay time of the packet corresponding to a certain period of time. The packet drop rate may be obtained when an ONU calculates the amount of packet drop when there is a packet not transmitted but dropped in an upstream buffer of the ONU and transmits the calculated packet drop amount to the OLT through operation, administration and maintenance (OAM) messages. Like this, raw data for obtaining the network state information, such as the number of transmission bits per time, the delay time of the packet, the packet drop rate, etc. may be obtained from individual nodes or may be obtained by analyzing information collected by an agent from each individual node.

Such collected network state information may be reported by an OLT agent to the SDN controller 100 through a south-bound (SB) interface. The reported network state information may be stored in the network state information storage 102 of the SDN controller 100. Using the network state information, the SDN controller may determine traffic transmission state of a specific node. Traffic overhead of a specific node refers to a phenomenon wherein traffic suddenly floods into the specific node and exceeds a traffic reference of the SLA. To determine the presence of the traffic overhead, threshold values may be set with regard to the delay time, the delay jitter, and the packet drop according to service classes. In comparison with the set threshold values, it is possible to determine that the corresponding node has the traffic overhead when the relevant network state information exceeds the threshold value.

A bandwidth control service application 108 refers to a software module that enables the manager to set the threshold value about the network state information and various parameters for service operation, and sets filtering conditions for an average transmission rate, a delay time, a jitter, and a packet drop in advance as the reference of the overhead.

The service abstractor 104 in the SDN controller routes forwarding messages between the modules (e.g., the network state information storage, the service abstractor, the traffic manager, etc.) and manages a traffic control service at an abstraction level while interworking a high-level north bound (NB) interface and a SB interface. The service abstractor analyzes network state information to generate a traffic overhead event with regard to a specific node. When the traffic overhead event occurs, the service abstractor 104 may issue a notification message about the traffic overhead event. When the issued notification message is transmitted to the traffic manager 106, the traffic manager 106 generates a network configuration and replaces the network configuration with the generated network configuration. Further, the traffic manager 106 may store the newly generated network configuration based on the traffic control algorithm. In this case, when a new network configuration is generated, the SDN controller 100 transmits the new network configuration to an OLT agent through the SB interface, thereby controlling the network to apply the new network configuration (or a bandwidth configuration) thereto.

Here, descriptions are made with respect to the optical access network shown in FIGS. 1 and 2, but these are for illustrative purposes. Further, it will be appreciated that the present invention is applicable to all the SDN-based networks.

Figure 4A:
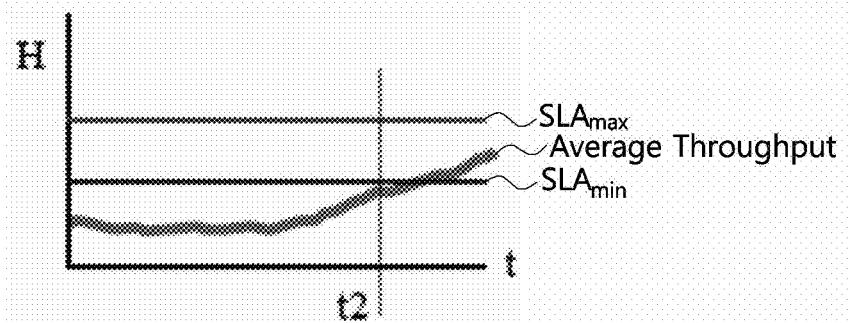
FIGS. 4A to 4C are graphs for showing packet drops caused by traffic overhead of a specific node in an SDN environment according to one embodiment of the present invention.
Figure 4B:
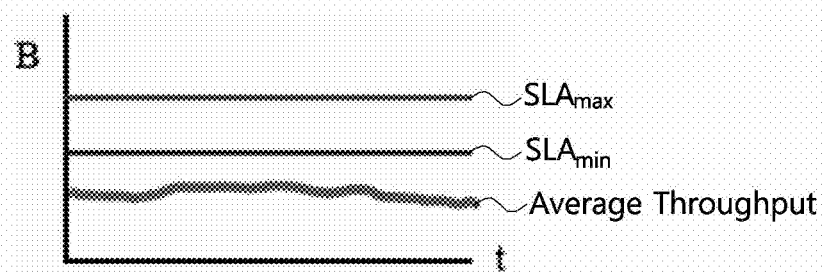
Figure 4C:
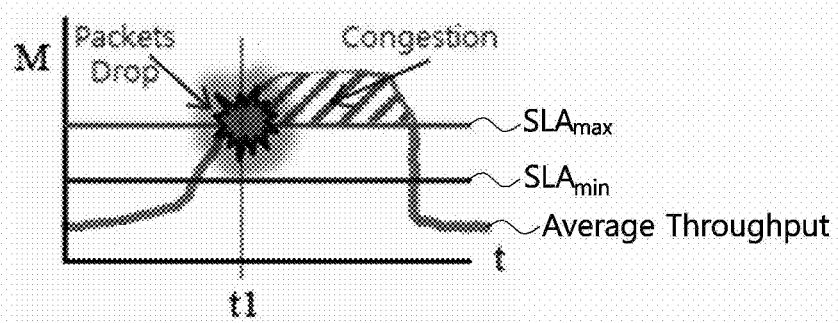

FIGS. 4A to 4C are graphs for showing packet drops caused by traffic overhead of a specific node in an SDN environment according to one embodiment of the present invention.

As a reference for setting a transmission limit to a specific node on the basis of the SLA, the maximum bandwidth $SLA_{max}$ and the minimum bandwidth $SLA_{min}$ may be used.

Referring to FIGS. 4A to 4C, the maximum bandwidth and the minimum bandwidth are set with regard to the ONU H, ONU B, ONU M nodes illustrated in FIG. 2, and each graph shows an average traffic throughput Average Throughput of each node. In this case, the minimum bandwidth $SLA_{min}$ refers to a bandwidth ensured for a corresponding node, i.e., a minimum bandwidth that has to be ensured for a corresponding node (or ONU) even under network traffic congestion, in which the sum of minimum bandwidths of all the nodes should be smaller than the total network traffic capacity (C) of the whole network (or optical network, PON) system. Therefore, a relationship between the minimum bandwidth and the whole network traffic capacity (C) of each node index of which is 'i') is defined by the following expression, Expression 1.

$$C > \Sigma_i SLA_{min}(i) \qquad \text{[Expression 1]}$$

Meanwhile, the maximum bandwidth $SLA_{max}$ refers to the maximum bandwidth to be used by a certain node in the network and means the maximum of the bandwidth allowable to the corresponding node (OTU) when another node occupies a small network capacity.

Further, the average traffic throughput Average Throughput of each node may be a value obtained by accumulating and averaging real-time in-sequence packet throughputs for a predetermined period of time.

Referring to FIG. 4A, in the case of an H node, an average traffic throughput (or an average transmission rate) is lower than the minimum bandwidth during most of the time and starts creasing at a time of t2.

Referring to FIG. 4B, in the case of a B node, an average traffic throughput is lower than the minimum bandwidth during a given period of time.

Referring to FIG. 4C, in the case of an M node, traffic suddenly increases (or traffic is concentrated on the M node) at a certain point of time, and a packet drop is largely generated from a point of time t1 where an average traffic throughput goes beyond the maximum bandwidth. Such a traffic congestion situation is solved after the lapse of a certain period of time. Here, the presence of the traffic congestion and overhead may be determined by not only the packet drop, but also a criterion for the delay time, the delay jitter, or the packet throughput. Further, the presence of the traffic overhead may be determined by different criteria corresponding to service classes classified according to traffic characteristics.

$$\overline{l_k^i} > l_{max}^i(k) \qquad \text{[Expression 2]}$$

$$\overline{d_k^i} > d_{max}^i(k) \qquad \text{[Expression 3]}$$

$$\overline{\sigma_k^i} > \sigma_{max}^i(k) \qquad \text{[Expression 4]}$$

Referring to the expressions 2 to 4 an average packet drop ($\overline{l_k^L}$), an average packet delay time ($\overline{d_k^i}$), and an average delay jitter ($\overline{\sigma_k^i}$) of the $i^{th}$ service class of the $k^{th}$ node are compared with the maximum packet drop ($l_{max}^L(k)$), the maximum packet delay time ($d_{max}^i(k)$), and the maximum delay jitter ($\sigma_{max}^i(k)$) set by the bandwidth control service application 108 of FIG. 3, thereby determining the presence of the traffic overhead.

Meanwhile, elastic traffic can adjust to changes in delay and throughput over wide ranges and meet the needs of its applications. Therefore the traffic overheads for the elastic traffic service classes can be determined on the basis of the traffic throughput and the packet drop rate. On the other hand, inelastic traffic does not adapt to changes in delay and jitter across a network. Therefore the traffic overheads for the inelastic traffic service classes can be determined on the basis of not only the traffic throughput and the packet drop but also the packet delay time and delay jitter.

According to one embodiment of the present invention, the bandwidth control method of resolving the traffic overhead to the specific node in the SDN environment increases an efficiency of using the network through more flexible traffic control in the network having the traffic characteristics dynamically varied depending on time as a method of minimizing network congestion where communication service quality is degraded by the traffic overhead in the specific node. For example, the traffic overhead is detected at the point of time t1 in FIG. 4C, a notification message is issued with regard to the detected traffic overhead, and a new bandwidth configuration is applied.

FIG. 5 is a basic flowchart of a traffic control method of solving service quality degradation caused by traffic overhead of a specific node in an SDN environment according to one embodiment of the present invention;

Referring to FIG. 5, the traffic control method of solving the service quality degradation caused by the traffic overhead in the specific node under the SDN environment includes an operation S500 of periodically collecting traffic network state information, an operation S502 of determining a traffic overhead state based on the collected traffic network state information, and making the service abstractor of the SDN controller generate an event about the traffic overhead in the specific node when it is determined that a specific node has traffic overhead, and an operation S504 of making the traffic manager of the SDN controller check whether there are additional bandwidth resources applicable to the node having the traffic overhead.

Here, the operation S504 of checking whether there are additional bandwidth resources applicable to the node having the traffic overhead may be performed by checking the following expression, Expression 5.

$$S = \begin{cases} 1 & C - \Sigma_i \overline{R_i} \geq v \\ 0 & \text{otherwise} \end{cases} \quad \text{[Expression 5]}$$

Referring to the expression 5, $\overline{R_1}$ is an average traffic throughput of the $i^{th}$ node, C is the traffic capacity of the whole network, and v is the minimum variance or reference value) for changing the bandwidth. Thus, it is determined that bandwidth resources are applicable to a specific node when a result of subtracting the sum of real-time average traffic throughputs of the nodes from the total traffic capacity C is greater than the minimum variance v. The minimum variance v refers to a minimum unit of variance by which the bandwidth is set with respect to the traffic overhead. The magnitude of the variance determines a reaction speed to a network configuration changed in response to a traffic overhead event.

When the network resource availability S of the expression 5 is 1, it is determined that the network resources are available, and a new network configuration may be generated while storing the current network configuration state (S506). The operation S506 may include a kind of backup operation for returning to the previous network configuration in the future.

Further, when the new previously generated network configuration is applied to the node where the traffic overhead occurs, the maximum bandwidth ($SLA_{max}^j(k)$) of the corresponding node may be represented by the following expression, Expression 6.

$$SLA_{max}^j(k) = SLA_{max}^{j-1}(k) + v(j=1,2,\ldots) \quad \text{[Expression 6]}$$

Referring to the Expression 6, j is an index indicating the number of times the configuration is changed because of the traffic overhead, and j increases from 0 whenever the configuration is changed. Therefore, the maximum bandwidth at j=0 may indicate an initial set value given to the corresponding node. Further, v may be a variance of increasing the maximum bandwidth, and k may be an index to indicate each node.

Meanwhile, when the network resource availability S is 0, it is determined that the other nodes have a great deal of traffic and there are no available bandwidth resources. Therefore, it is impossible to solve a traffic overhead problem in the specific node. This phenomenon is caused not by a traffic concentration phenomenon but a total traffic increase in the network, and thus it is a situation wherein the capacity of the network needs to increase.

When the network configuration is changed in response to a traffic overhead event, the following five situations may occur after the change.

1. A traffic overhead event occurs again in the same node after changing the bandwidth configuration.
2. The traffic overhead in the corresponding node is solved.
3. The total network capacity is insufficient.
4. Another node has traffic overhead after the traffic overhead event occurs.
5. The traffic overhead event occurs in a plurality of nodes.

The first situation refers to a case wherein the traffic overhead problem is not resolved and the traffic overhead event occurs again in the next event cycle even after the configuration is changed (for example, even after the maximum bandwidth is changed) in the node where the traffic overhead event occurs. In this situation, procedures of FIG. 5 may be performed in accordance with network resource availability as if the traffic overhead is occurring for the first time.

The second, third, fourth, and fifth situations will be described below with reference to FIGS. 6, 7, 8 and 9, respectively.

Figure 6:
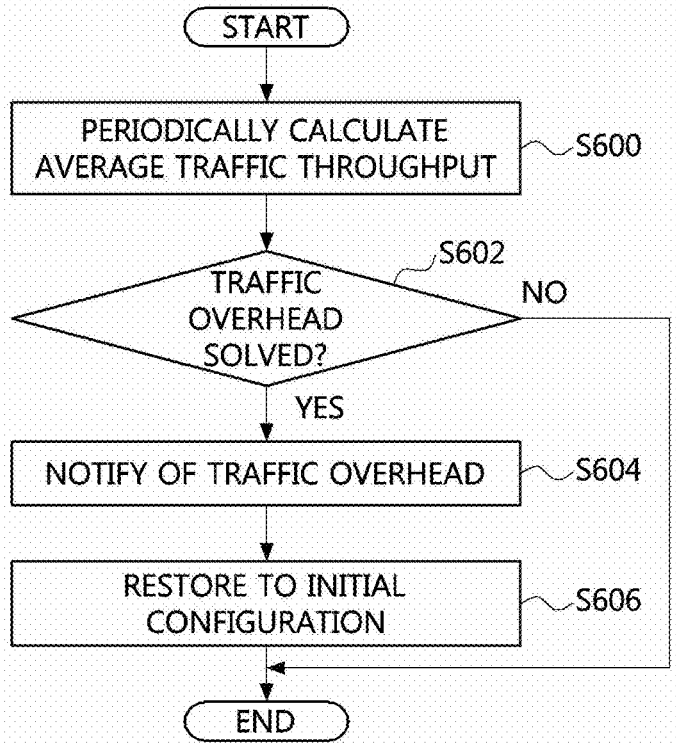
FIG. 6 is a flowchart of a method of checking whether traffic overhead of a specific node is resolved in an SDN environment according to one embodiment of the present invention.

FIG. 6 is a flowchart of a method of checking whether traffic overhead of a specific node is resolved in an SDN environment according to one embodiment of the present invention.

The second situation in FIG. 5 refers to a case wherein the traffic overhead is resolved in the node where the traffic overhead occurs. Referring to FIG. 6, an average traffic throughput is periodically calculated by monitoring the node where the traffic overhead occurs (S600). On the basis of the calculated average traffic throughput, it is possible to determine whether the traffic overhead is solved with regard to the corresponding node (S602). In this situation, the following expression, Expression 7 may be used to determine whether the traffic overhead is solved.

$$\overline{R_k} < SLA_{max}^0(k) \quad \text{[Expression 7]}$$

Referring to the expression 7, is an average traffic throughput of the $k^{th}$ node where the configuration is changed due to the occurrence of the traffic overhead. When the current average traffic throughput is less than the initial maximum bandwidth ($SLA_{max}^0(k)$) set in the corresponding node, it is determined that the traffic overhead is solved. Further, the references of the delay time, the delay jitter, and the packet throughput may be used in the determination like the following expressions, Expressions 8 to 10.

$$\overline{l_k^i} < l_{max}^i(k) \quad \text{[Expression 8]}$$

$$\overline{d_k^i} < d_{max}^i(k) \quad \text{[Expression 9]}$$

$$\overline{\sigma_k^i} < \sigma_{max}^i(k) \quad \text{[Expression 10]}$$

Referring to the expressions 8 to 10, an average packet drop ($\overline{l_k^i}$), an average packet delay time ($\overline{d_k^i}$), and an average delay jitter ($\overline{\sigma_k^i}$) of the $i^{th}$ service class of the $k^{th}$ node are compared with the maximum packet drop ($l_{max}^i(k)$), the maximum packet delay time ($d_{max}^i(k)$), and the maximum delay jitter ($\sigma_{max}^i(k)$) set by the bandwidth control service at 108, thereby determining that the traffic overhead is solved.

When the average traffic throughput of the $k^{th}$ node is periodically monitored and it is determined by the expressions 7 to 10 that the traffic overhead is solved, a service abstract module of the SDN controller may generate a traffic overheat resolved event (S604). When the traffic overheat solved event is generated, the SDN controller may restore the network configuration of the corresponding node to the original first configuration (S606).

Figure 7:
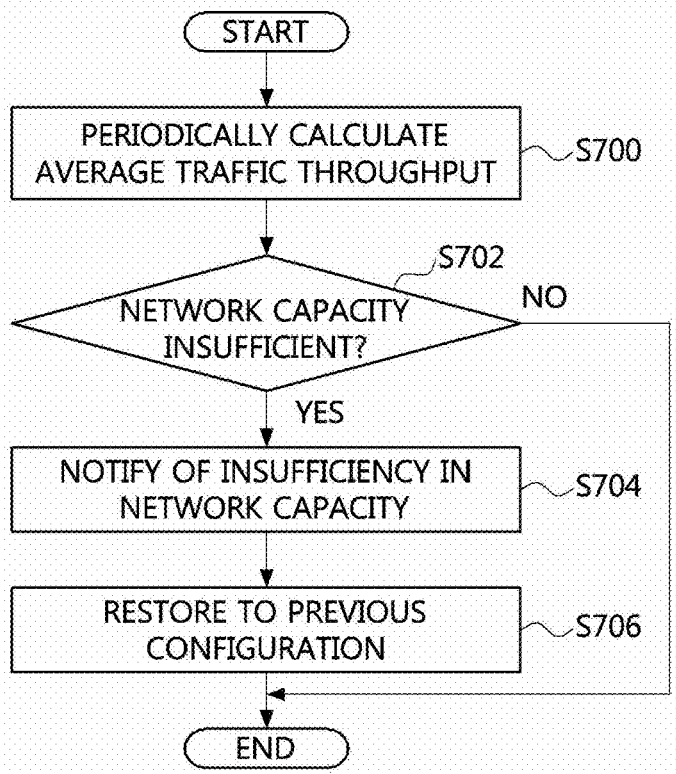
FIG. 7 is a flowchart showing a case where a total network capacity is insufficient during traffic control for solving service quality degradation caused by traffic overhead of a specific node in an SDN environment according to one embodiment of the present invention.

FIG. 7 is a flowchart showing a case where a total network capacity is insufficient during traffic control for solving service quality degradation caused by traffic overhead of a specific node in an SDN environment according to one embodiment of the present invention.

The third situation in FIG. 5 refers to a case wherein the network capacity insufficient as the network resources are changed. Referring to FIG. 7, the SDN controller (or the service abstract module) may periodically calculate the average traffic throughput of each node in the network after changing the network configuration for the specific node in accordance with FIG. 5 (S700). In this situation, on the basis of the average traffic throughputs periodically calculated with regard to the nodes, it is possible to determine by the following expression, Expression 11, whether the total network capacity is insufficient (S702).

$$L = \begin{cases} 1 & C - \Sigma_i \overline{R_i} < \delta \\ 0 & \text{otherwise} \end{cases} \quad \text{[Expression 11]}$$

Referring to the Expression 11, after the bandwidth configuration is changed due to the traffic overhead in the specific node, the average traffic throughput of each node is periodically examined. When a result of subtracting the sum of average transmission rates ($\overline{R_i}$, or average traffic volumes) of the nodes (designated by an index i) from the total traffic capacity C is smaller than a certain protection bandwidth ($\delta$, or a threshold value), the SDN controller (or the service abstract module) may generate an event with regard to insufficiency in the total network capacity (S704). When the SDN controller (or the traffic manager) receives a insufficient capacity event, the network configuration changed due to the traffic overhead in the node may be restored to the previous state (S706). Here, the previous state indicates the previous network configuration just before changing the last network configuration with regard to the node. In this case, the certain protection bandwidth ($\delta$) serves to prevent a problem of providing the bandwidth to another node from arising due to the change in the bandwidth configuration with regard to the specific node.

Figure 8:
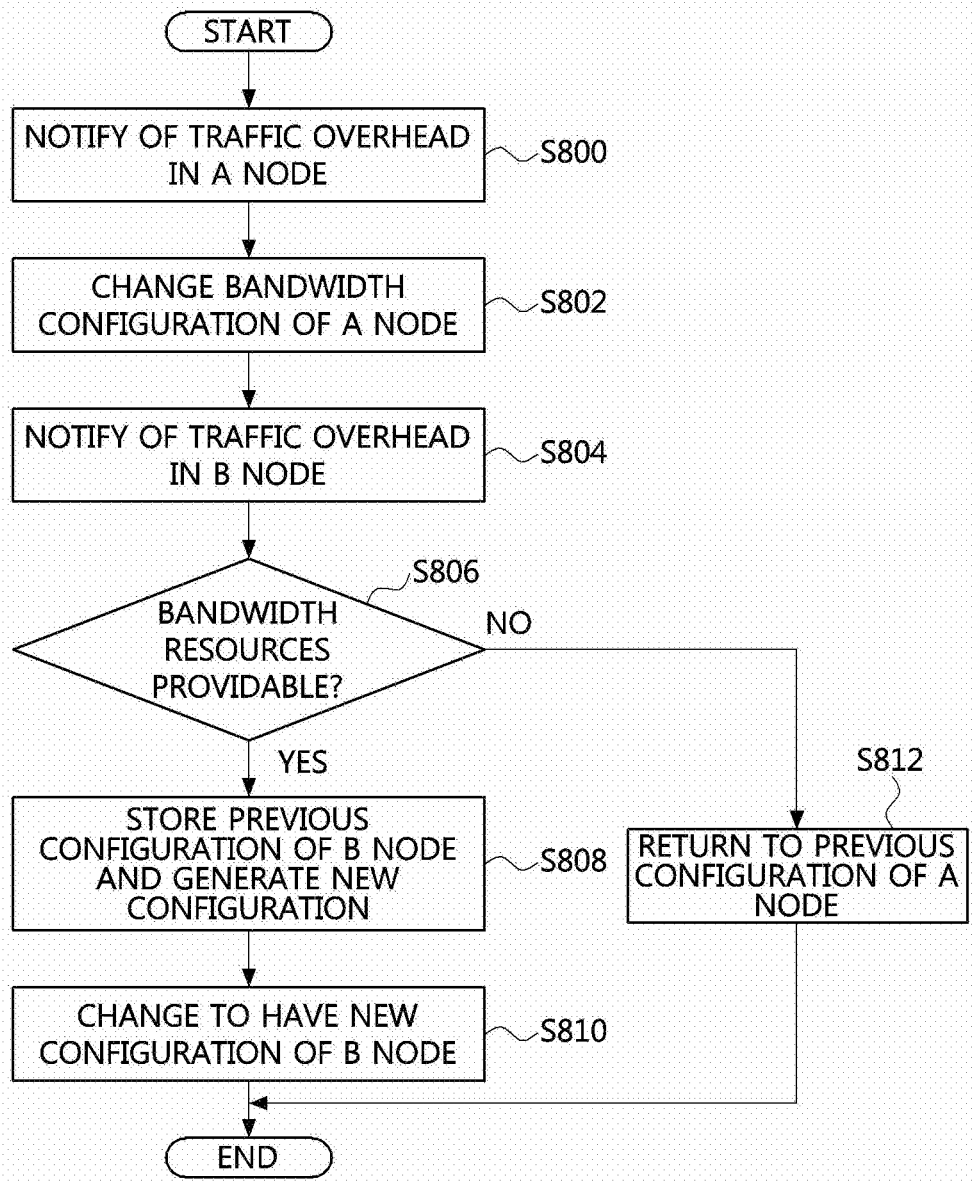
FIG. 8 is a flowchart showing a case where traffic concentration occurs in another node after traffic control for solving service quality degradation caused by traffic overhead of a specific node in an SDN environment according to one embodiment of the present invention.

FIG. 8 is a flowchart showing a case where traffic overhead occurs in another node after traffic control for solving service quality degradation caused by traffic overhead of a specific node in an SDN environment according to one embodiment of the present invention;

The fourth situation in FIG. 5 refers to a case wherein the traffic overhead occurs in another node consecutively after the bandwidth is changed due to the traffic overhead in the specific node. In this case, when there are available network bandwidth resources, bandwidth change may be granted to the node where the second traffic overhead occurs. On the other hand, when the network resources are not available, the bandwidth change is not granted to the node where the traffic overhead. Therefore, the node where the traffic overhead first occurs occupies the bandwidth first, and no network resources may be provided to the node where the traffic overhead occurs later. To solve such a problem, when the traffic overhead consecutively occurs in another node, the network configuration in the node where the traffic overhead has already occurred is restored to the previous state, and the bandwidth is additionally provided to a node where network overhead is more serious in response to the traffic overhead event generated in the future.

Referring to FIG. 8, when a traffic overhead event is generated in an A node (S800), the network configuration (or bandwidth configuration) of the A node is changed (S802). Then, a traffic overhead event is generated in a B node (S804). When the traffic overhead event is generated in the B node, the network resource availability is checked through the foregoing Expression 2 (S806). When there are available network resources, the current network configuration (or bandwidth configuration) of the B node is stored, and a new network configuration may be set to additionally provide network resources (for example, the maximum bandwidth) (S808). Next, the network configuration of the B node is replaced by the new network configuration (S810).

Figure 9:
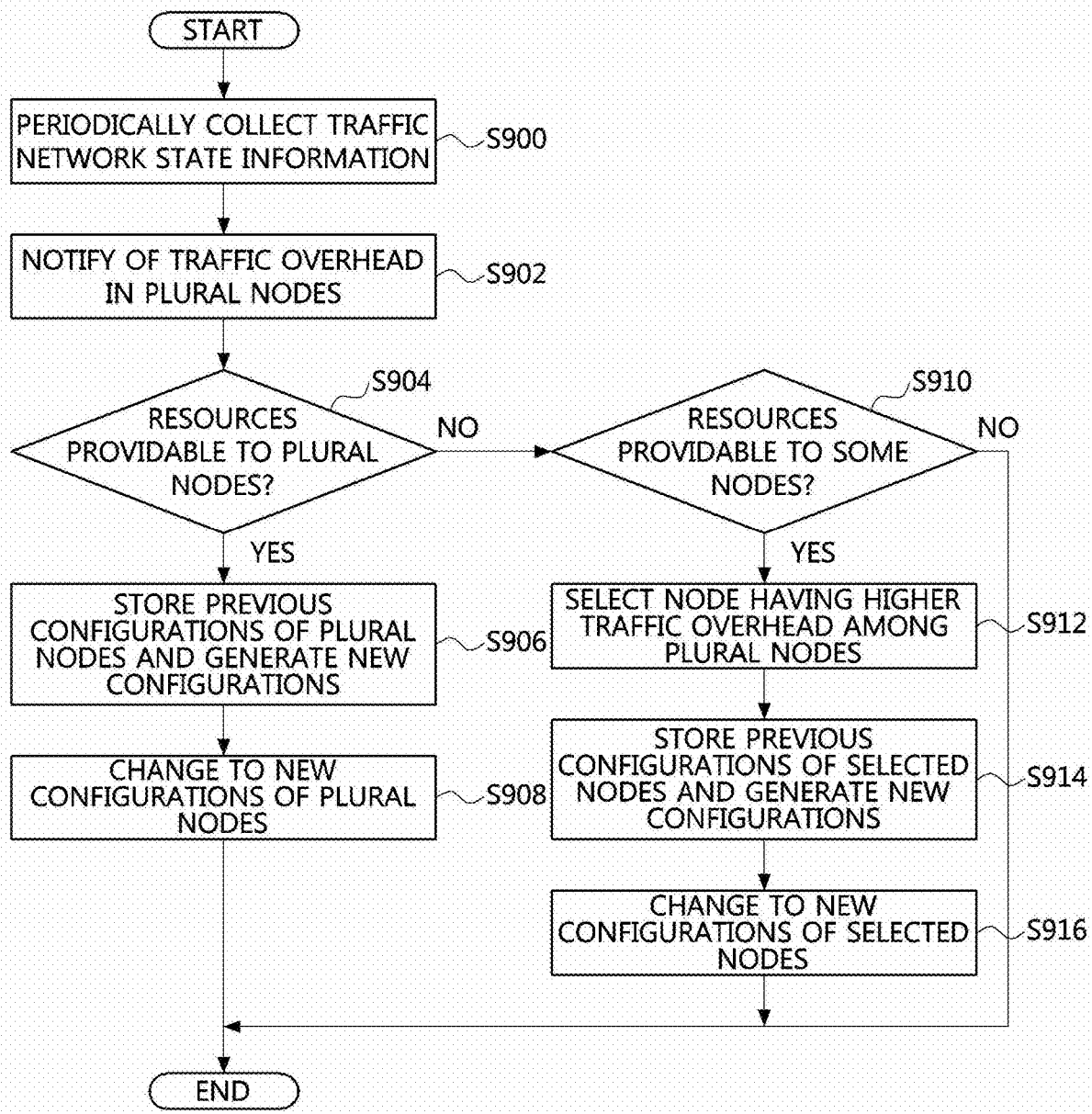
FIG. 9 is a flowchart of a traffic control method of solving service quality degradation caused by traffic overhead of a plurality of nodes in an SDN environment according to one embodiment of the present invention.

Meanwhile, in the operation S806, when there are no available network resources B, the network configuration in the node B is not changed. In this case, the traffic overhead in the B node is not resolved in order to resolve the traffic overhead in the A node, and therefore it may be fair when all the nodes of which network configurations are changed in response to the previously generated traffic overhead event are restored to the previous network configuration (just before the change). Therefore, the network configuration of the A node where the traffic overhead has previously occurred is restored to the previous state just before the change (S812), thereby providing additional bandwidth resources to a node, for which urgent traffic control is needed, in response to the next traffic overhead event FIG. 9 is a flowchart of a traffic control method of solving service quality degradation caused by traffic overhead of a plurality of nodes in an SDN environment according to one embodiment of the present invention;

The fifth situation in FIG. 5 refers to a case wherein a traffic overhead event occurs with regard to the plurality of nodes. Like the fourth situation where the traffic overhead occurs in the plurality of nodes, the traffic overhead events may be simultaneously generated in two or more nodes at a point of time when the traffic overhead event is generated.

Referring to FIG. 5, the SDN controller periodically collects traffic network state information about the network (S900), thereby checking traffic overhead. In this case, when the traffic overhead event is generated with regard to the plurality of nodes (S902), it is determined whether there are available network resources with regard to the plurality of nodes where the traffic overhead occurs. (S904).

Here, the following expression, Expression 12 may be used to determine whether there are available network resources with regard to the plurality of nodes where the traffic overhead occurs.

$$S = \begin{cases} 1 & C - \Sigma_i \overline{R_i} \geq v \times n \\ 0 & \text{otherwise} \end{cases} \quad \text{[Expression 12]}$$

Referring to the Expression 12, n is the number of nodes where the traffic overhead occurs, vis a certain protection bandwidth (or threshold value), C is a total network bandwidth capacity, and $\overline{R_i}$ is an average traffic volume of each individual node. When the availability (S) of the network resources (or bandwidth resources) is 1, network configurations for the plurality of nodes where the traffic overhead occurs are stored, and new network configurations may be generated to provide additional network resources (S906). Then, the network configurations of the plurality of nodes where the traffic overhead occurs are changed into the generated network configuration (S908).

Meanwhile, in the operation S904, when the availability (S) of the network, resources is determined to be 0, it is determined whether additional bandwidth resources are available to some nodes while decreasing n of the Expression 12 by 1 (S910). As many nodes as the number of nodes determined in the operation S910 may be selected from among the plurality of nodes where the traffic overhead occurs (S912). In this case, a node having higher traffic overhead may be selected when some nodes are selected among the plurality of nodes where the traffic overhead occurs. For example, a node having higher traffic overhead may be selected in terms of the packet drop rate or the delay time. Next, the network configurations of the selected nodes are stored, and new network configurations for providing additional network resources are then generated (S914). The network configurations of the selected nodes may be replaced by the new generated network configurations (S916).

In other words, a processing procedure on a situation wherein two nodes simultaneously have traffic overhead will be given by way of example. First, when bandwidth resources are available to both the nodes, additional bandwidths may be set and changed with regard to all the two nodes. On the other hand, when no network resources are available to all the two nodes, it is first calculated whether there are additional bandwidth resources available to one of the nodes. Next, when there are bandwidth resources available to one node, the node having higher traffic overhead between the two nodes (for example, the node having higher overhead in light of the packet drop rate or the delay time) is selected and preferentially configured to occupy the additional bandwidth.

Figure 10:
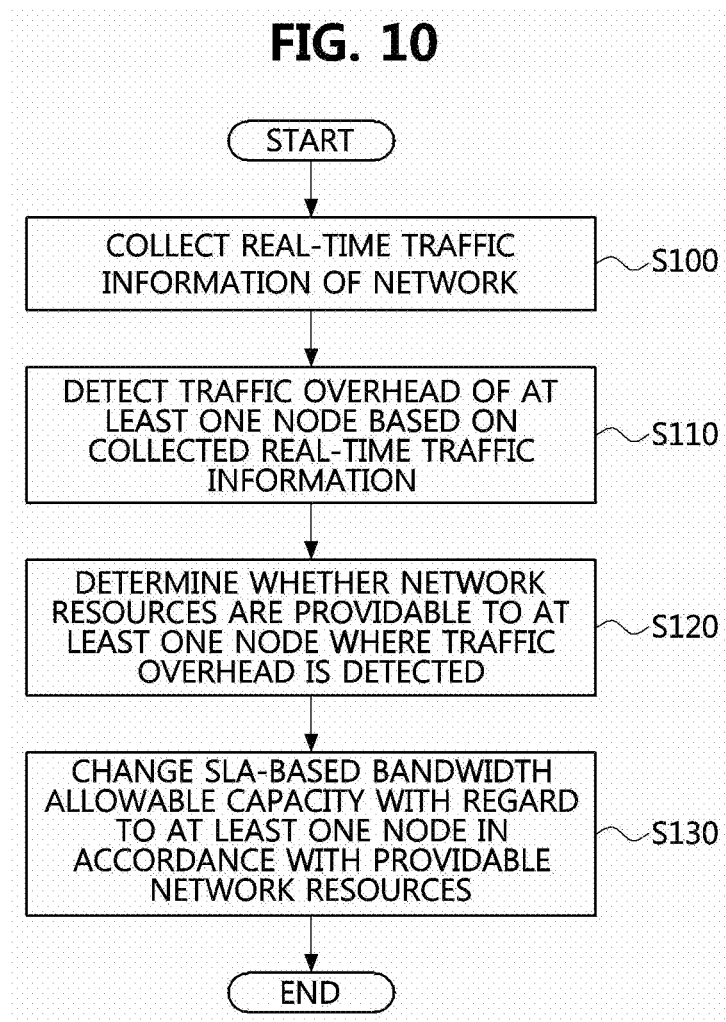
FIG. 10 is a representative flowchart of a traffic control method of solving service quality degradation caused by traffic overhead of a specific node in an SDN environment according to one embodiment of the present invention.

FIG. 10 is a representative flowchart of a traffic control method of solving service quality degradation caused by traffic overhead of a specific node in an SDN environment according to one embodiment of the present invention.

Referring to FIG. 10, the traffic control method of solving service quality degradation caused by traffic overhead in a specific node under the SDN environment may include an operation S100 of collecting real time traffic state information of a network, an operation S110 of detecting traffic overhead in at least one node on the basis of the collected real-time traffic state information, an operation S120 of determining whether there are network resources available to the at least one node where the traffic overhead is detected, and an operation S130 of changing an SLA-based allowable bandwidth capacity with regard to the at least one node in accordance with available network resources.

Here, the collecting operation S100 may collect the information from a PON-based agent terminal (OLT).

Here, the operation S110 of detecting the traffic overhead may include an operation of obtaining network state information based on the real-time traffic state information, and an operation of detecting the traffic overhead with regard to the at least one node by using the obtained network state information.

Here, the network state information may include at least one among a traffic throughput, a delay time, a delay jitter, and a packet drop rate.

Here, the operation S110 of detecting the traffic overhead may include an operation of classifying service classes in accordance with traffic characteristics required for the at least one node, an operation of adaptively setting a reference of the network state information according to the classified service class, and an operation of detecting the traffic overhead with regard to the at least one node on the basis of the set reference.

Here, after the changing operation S130, there may be provided an operation of periodically monitoring a traffic throughput of each node involved in the network and determining whether the total resource capacity of the network is insufficient, and an operation of restoring the bandwidth allowable capacity of the at least one node back to a state just before the change when the total resource capacity of the network is insufficient.

Here, the changing operation S130 may further include an operation of selecting nodes having higher traffic overhead among a plurality of nodes and an operation of changing the SLA-based bandwidth allowable capacity with respect to the selected nodes when the at least one node includes the plurality of nodes and network resources are available to some nodes among the plurality of nodes in the operation of determining whether he network resources are available to the at least one node.

Here, in the changing operation S130, the bandwidth allowable capacity may be stepwise increased by as much as a preset increment in accordance with the number of changing times.

Here, after the changing operation S130, there may be provided an operation of determining whether the traffic overhead is solved with regard to the at least one node, and an operation of changing the bandwidth allowable capacity into an initial setting value for the at least one node when the traffic overhead is solved.

Here, the operation of determining whether the traffic overhead is solved may be achieved based on at least one of the average traffic throughput, the average packet drop, the average packet delay time, and the average packet delay jitter with respect to the at least one node.

Figure 11:
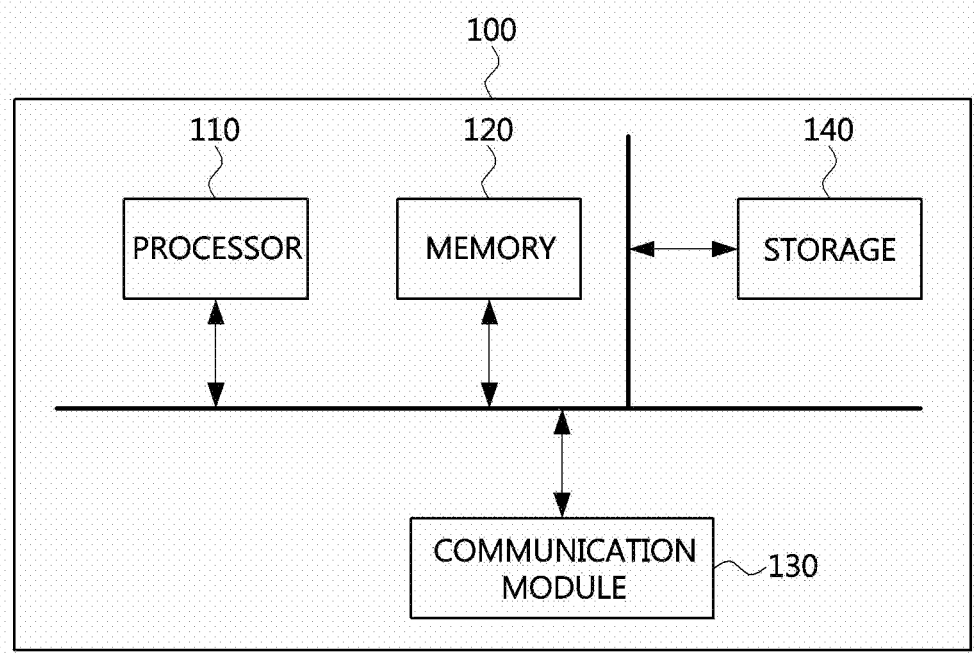
FIG. 11 is a configuration diagram of a traffic control apparatus for solving service quality degradation caused by traffic overhead of a specific node in an SDN environment according to one embodiment of the present invention.

FIG. 11 is a configuration diagram of a traffic control apparatus for solving service quality degradation caused by traffic overhead of a specific node in an SDN environment according to one embodiment of the present invention.

Referring to FIG. 11, a traffic control apparatus 100 for solving service quality degradation caused by traffic overhead in a specific node under the SDN environment may include at least one processor 110 and a memory 120 configured to store instructions for instructing the at least one processor to perform at least one operation.

Here, the apparatus 100 for solving service quality degradation caused by traffic overhead in a specific node under the SDN environment may further include an OLT installed in a telecommunication company and a communication module 130 capable of communication through an optical network.

Here, the apparatus 100 for solving service quality degradation caused by traffic overhead in a specific node under the SDN environment may further include a storage 140 for collecting and storing real-time traffic state information and for storing network state information derived using the collected real-time traffic state information.

Here, the at least one operation may include an operation of collecting the real-time traffic state information of the network, an operation of detecting traffic overhead from at least one node on the basis of the collected real-time traffic state information, an operation of determining whether network resources are available to the at least one node from which the traffic overhead is detected, and an operation of changing an SLA-based bandwidth allowable capacity with respect to the at least one node in accordance with the available network resources.

Here, the collecting operation may collect the information from a PON-based agent terminal (OLT).

Here, the operation of detecting the traffic overhead may include an operation of obtaining the network state information based on the real-time traffic state information and an operation of detecting the traffic overhead of the at least one node by using the obtained network state information.

Here, the network state information may include at least one among a traffic throughput, a delay time, a delay jitter and a packet drop rate.

Here, the operation of detecting the traffic overhead may include an operation of classifying service classes in accordance with traffic characteristics required for the at least one node, an operation of adaptively setting a reference of the network state information according to the classified service class, and an operation of detecting the traffic overhead with regard to the at least one node on the basis of the set reference.

Here, after the changing operation, there may be provided an operation of periodically monitoring a traffic throughput of each node involved in the network and determining whether the total network resource capacity is insufficient and an operation of restoring the bandwidth allowable capacity of the at least one node back to a state just before the change when it is determined that the total resource capacity of the network is insufficient.

Here, the changing operation may further include an operation of selecting nodes having higher traffic overhead among a plurality of nodes and an operation of changing the SLA-based bandwidth allowable capacity with respect to the selected nodes, when the at least one node includes the plurality of nodes and network resources are available to some nodes among the plurality of nodes in the operation of determining whether the network resources are available to be provided to the at least one node Here, in the changing operation, the bandwidth allowable capacity may be increased stepwise by as much as a preset increment in accordance with the number of changing times.

Here, after the changing operation, there may be provided an operation of determining whether the traffic overhead is solved with regard to the at least one node, and an operation of changing the bandwidth allowable capacity into an initial setting value for the at least one node when the traffic overhead is solved.

Here, the operation of determining whether the traffic overhead is solved may be achieved on the basis of at least one of the average traffic throughput, the average packet drop, the average packet delay time, and the average packet delay jitter with respect to the at least one node.

Here, the apparatus 100 for solving service quality degradation caused by traffic overhead in a specific node under the SDN environment may be, for example, representatively materialized by the SDN controller and may include a desktop computer, a laptop computer, a notebook computer, a smart phone, a tablet personal computer (PC), a mobile phone, a smart watch, smart glasses, an e-book reader, a portable multimedia player (PMP), a handheld game console, a global positioning system (GPS), a digital camera, a digital multimedia broadcasting (DMB) player, a digital audio recorder, a digital audio player, a digital video recorder, a digital video player, a personal digital assistant (PDA), and the like capable of performing communication.

Figure 12:
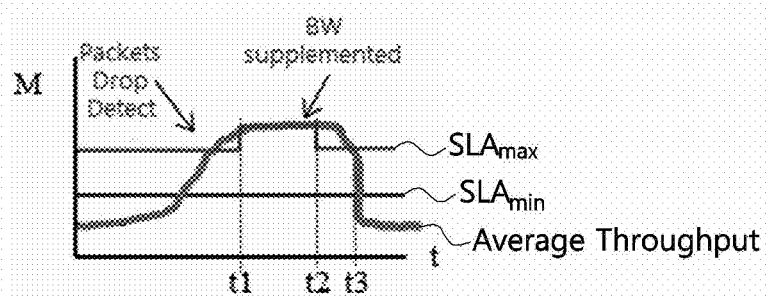
FIG. 12 is a graph for describing an effect of a traffic control method for solving service quality degradation caused by traffic overhead of a specific node in an SDN environment according to one embodiment of the present invention.

FIG. 12 is a graph for describing an effect of a traffic control method for solving service quality degradation caused by traffic overhead of a specific node in an SDN environment according to one embodiment of the present invention; and Referring to FIG. 12, the packet drop is detected before a point of time t1 in the M node described with reference to FIG. 4C. Therefore, at the point of time t1, the SDN controller may generate a traffic overhead event with regard to the M node, and apply a new bandwidth configuration to the M node. With the new bandwidth configuration, the maximum bandwidth ($SLA_{max}$) of the M node is increased at the point of time t1, and thus the packet drop in the M node is decreased.

Then, the bandwidth configuration of the M node is restored to the previous configuration in response to an insufficient network capacity event as traffic of another H node is increasing at a point of time t2.

Further, in response to a traffic overhead solved event as an average traffic volume is suddenly decreased in the M node at a point of time t3, thereby informing that the traffic overhead is solved, and restoration to the original initial configuration is performed.

Figure 13:
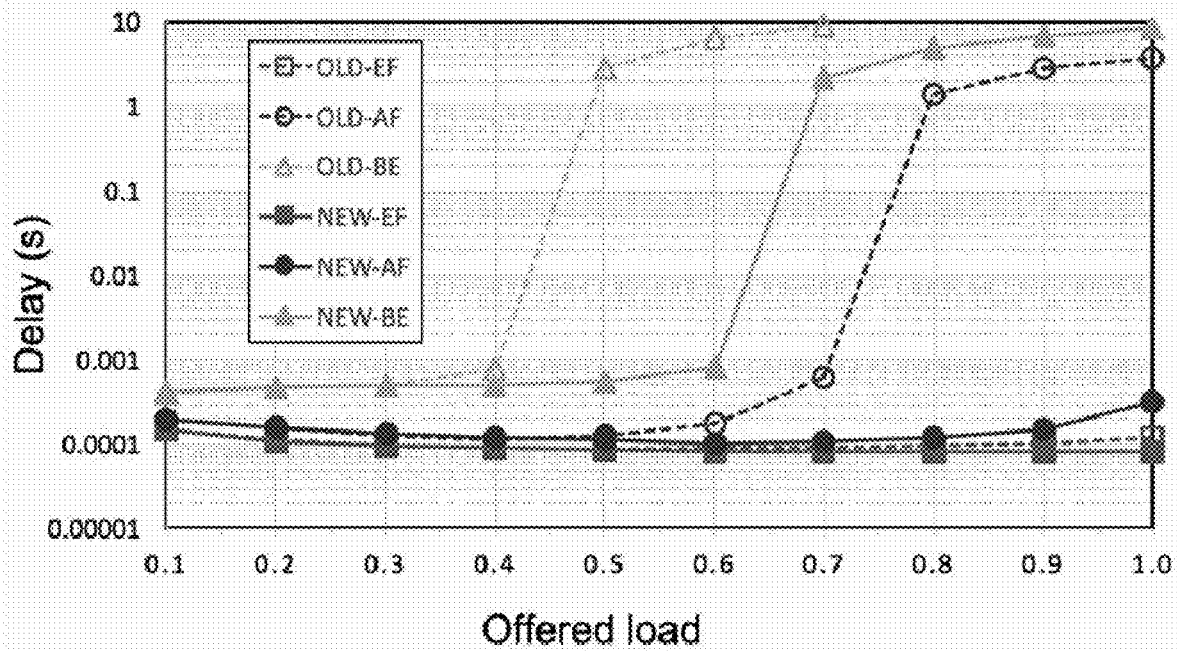
FIGS. 13 and 14 illustrate simulation results of a bandwidth control method of solving service quality degradation caused by traffic overhead of a specific node in an SDN environment according to one embodiment of the present invention.
Figure 14:
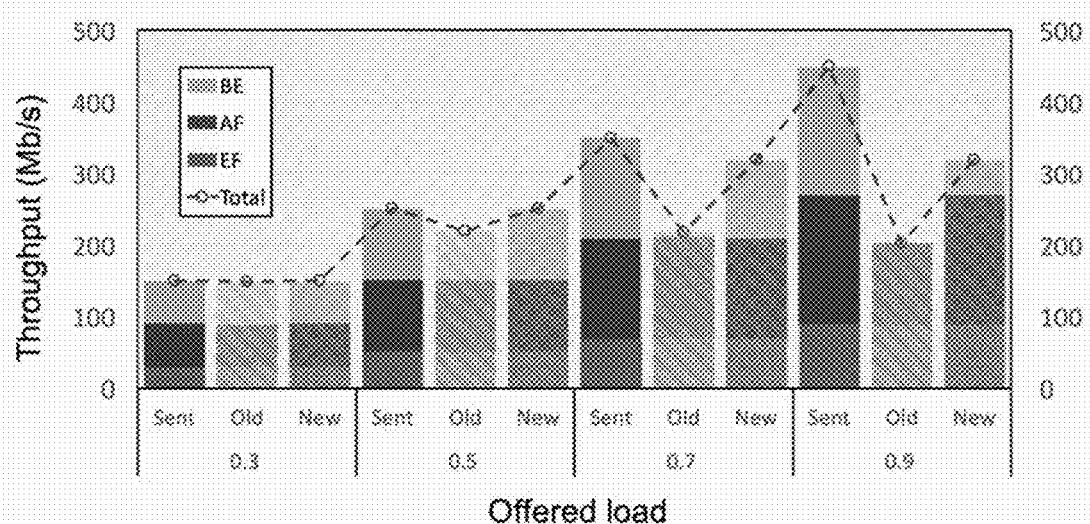

FIGS. 13 and 14 illustrate simulation results of a bandwidth control method of solving service quality degradation caused by traffic overhead of a specific node in an SDN environment according to one embodiment of the present invention.

Here, FIG. 13 is a graph for describing a packet delay time. FIG. 14 is a graph for describing a packet throughput.

In simulations, it was assumed that the number (N) of nodes (or ONUS) was 16, and all the nodes (or ONUs) had the same maximum transmission windows. A bandwidth allocation polling cycle (T_max) of a scheduler was 1 ms, a guard time was 100 ns, and a buffer size of a service class queue was 10 Mbytes. For the simulations, the following conditions were taken into account. Under the conditions that 50% of the total traffic load was concentrated on one specific ONU among 16 ONUs and traffic concentration was not higher than 50% of total load (or traffic) occurring in the other nodes, comparison between the conventional configuration and the inventive configuration was made in terms of the packet delay time and the packet drop according to the service classes while increasing the total traffic load of the network.

FIG. 13 shows simulation results in terms of the packet transmission delay time in the node on which traffic is concentrated according to offered loads of the network. Specifically, when total network load (abscissa) reaches 0.4 (40%) of the total network capacity, the packet delay time (ordinate) started increasing and then suddenly increasing from the packet OLD best effort (BE) having low priority. When the network load reaches 0.7 (70%), the packet delay time started largely increasing in the packet OLD-assured forwarding (AF) as well as BE, and thus service quality was considerably degraded.

On the other hand, the packets (NEW-expedited forwarding (EF), NEW-AF, NEWBE), to which the traffic control method of solving service quality degradation caused by traffic overhead of a specific node in an SDN environment was applied according to one embodiment of the present invention, were improved by solving a congestion problem due to traffic concentration under intellectual bandwidth control to be free from the influence of the packet delay time by 20% or more.

Further, referring to FIG. 14, in terms of the packet throughput, the network load (abscissa) did not have a great influence when is the network load was lower than or equal to 0.5 (50%) of the network capacity, but the packet drop was largely generated when the network load was higher than or equal to 0.5 (50%) of the network capacity. When the network load (abscissa) reaches 0.9 (90%), the packet drop rates were 2% in the OLD-EF (the packet having the highest priority), 36% in the OLD-AF, and 100% in the OLD-BE.

On the other hand, the packet drop rates, to which the traffic control method of solving service quality degradation caused by traffic overhead of a specific node in an SDN environment was applied according to one embodiment of the present invention, were 0% in the NEW-EF, 0% in the NEW-AF 0%, and 72% in the NEW-BE under the condition that the network load reaches 0.9 (90%), and thus the network packet drop rate was reduced by more than 30%.

As described above, when the bandwidth control method and apparatus for solving the service quality degradation caused by the traffic overhead in the SDN-based communication node is used according to the present invention, it is possible to solve user service quality degradation caused by a traffic congestion in a specific node due to a momentary traffic concentration phenomenon.

Further, an advantage of the present invention is that it is possible to minimize the service quality degradation and increase a network use efficiency by grasping traffic increase of each individual node as well as traffic increase in the whole network and dynamically changing the network configuration.

While the example embodiments of the present invention and their advantages have been described in detail, it should be understood that various changes, substitutions and alterations may be made herein without departing from the scope of the invention.

What is claimed is:

1. A traffic control method to be performed by a software defined network (SDN) controller in an SDN environment, the traffic control method comprising:
    collecting real-time traffic state information of a network including a plurality of nodes;
    detecting at least one of the nodes with traffic overhead using the collected real-time traffic state information;
    determining whether network resources are available to the at least one node where the traffic overhead is detected; and
    changing a service level agreement (SLA)-based bandwidth capacity for the at least one node in accordance with the available network resources,
    wherein the determining is made based on a total traffic capacity of the network and real-time traffic state information of others of the nodes where the traffic overhead is not detected.

2. The traffic control method of claim 1, wherein the collecting of the real-time traffic state information comprises collecting the real-time traffic state information from a passive optical network (PON)-based agent terminal (optical line terminal, OLT).

3. The traffic control method of claim 1, wherein the detecting of the traffic overhead comprises:
    obtaining network state information based on the real-time traffic state information; and
    detecting traffic overhead of the at least one node using the network state information.

4. The traffic control method of claim 3, wherein the network state information comprises at least one of a traffic throughput, a delay time, a delay jitter, and a packet drop rate.

5. The traffic control method of claim 3, wherein the detecting of the traffic overhead comprises:
    classifying service classes in accordance with traffic characteristics required for the at least one node;
    setting a reference for the network state information adaptively in accordance with the classified service classes; and
    detecting traffic overhead with regard to the at least one node on the basis of the set reference.

6. The traffic control method of claim 1, further comprising: after the changing of the bandwidth capacity,
    periodically monitoring a traffic throughput of each node included in the network and determining insufficiency in a total resource capacity of the network; and
    restoring the changed bandwidth capacity of the at least one node to a preceding bandwidth capacity of the at least one node just before the changing of the bandwidth capacity, when it is determined that the total resource capacity of the network is insufficient.

7. The traffic control method of claim 1, wherein, when the at least one node comprises a plurality of nodes and the network resources are available to a part of the plurality of nodes in the determining whether the network resources are available to the at least one node, the changing of the bandwidth capacity comprises:
    selecting nodes having higher traffic overhead among the plurality of nodes; and
    changing the SLA-based bandwidth capacity with regard to the selected nodes.

8. The traffic control method of claim 1, wherein the changing of the bandwidth capacity comprises increasing the bandwidth capacity stepwise by a preset increment in accordance with the number of changing times.

9. The traffic control method of claim 1, further comprising: after the changing of the bandwidth capacity,
    determining whether traffic overhead in the at least one node is solved; and
    changing the bandwidth capacity of the at least one node to an initial set value when it is determined that the traffic overhead is resolved.

10. The traffic control method of claim 9, wherein the determining of whether the traffic overhead is solved comprises making the determination based on at least one of an average traffic throughput, an average packet drop, an average packet delay time, and an average packet delay jitter in the at least one node.

11. A software defined network (SDN) controller for controlling traffic in an SDN environment, the SDN controller comprising:
   at least one processor; and
   a memory configured to store instructions for instructing the at least one processor to perform at least one operation,
   wherein the at least one operation comprises:
   collecting real-time traffic state information of a network including a plurality of nodes;
   detecting at least one of the nodes with traffic overhead using the collected real-time traffic state information;
   determining whether network resources are available to the at least one node where the traffic overhead is detected; and
   changing an SLA-based bandwidth capacity for the at least one node in accordance with the available network resources,
   wherein the determining is made based on a total traffic capacity of the network and real-time traffic state information of others of the nodes where the traffic overhead is not detected.

12. The SDN controller of claim 11, wherein the collecting of the real-time traffic state information comprises collecting the real-time traffic state information from a passive optical network (PON)-based agent terminal (optical line terminal, OLT).

13. The SDN controller of claim 11, wherein the detecting of the traffic overhead comprises:
   obtaining network state information based on the real-time traffic state information; and
   detecting traffic overhead of the at least one node using the network state information.

14. The SDN controller of claim 13, wherein the network state information comprises at least one of a traffic throughput, a delay time, a delay jitter, and a packet drop rate.

15. The SDN controller of claim 13, wherein the detecting of the traffic overhead comprises:
   classifying service classes in accordance with traffic characteristics required for the at least one node;
   setting a reference for the network state information adaptively in accordance with the classified service classes; and
   detecting traffic overhead with regard to the at least one node on the basis of the set reference.

16. The SDN controller of claim 11, wherein, after the changing of the bandwidth capacity,
   the at least one operation further comprises:
   periodically monitoring a traffic throughput of each node included in the network and determining insufficiency in a total resource capacity of the network; and
   restoring the changed bandwidth capacity of the at least one node to a preceding bandwidth capacity of the at least one node just before the changing of the bandwidth capacity, when it is determined that the total resource capacity of the network is insufficient.

17. The SDN controller of claim 11, wherein, when the at least one node comprises a plurality of nodes and the network resources are available to a part of the plurality of nodes in the determining whether the network resources are available to the at least one node, the changing of the bandwidth capacity comprises:
   selecting nodes having higher traffic overhead among the plurality of nodes; and
   changing the SLA-based bandwidth capacity with regard to the selected nodes.

18. The SDN controller of claim 11, wherein the changing of the bandwidth capacity comprises increasing the bandwidth capacity stepwise by a preset increment in accordance with the number of changing times.

19. The SDN controller of claim 11, wherein, after the changing of the bandwidth capacity,
   the at least one operation further comprises:
   determining whether traffic overhead in the at least one node is solved; and
   changing the bandwidth capacity of the at least one node to an initial set value when it is determined that the traffic overhead is resolved.

20. The SDN controller of claim 19, wherein the determining of whether the traffic overhead is resolved comprises making the determination based on at least one of an average traffic throughput, an average packet drop, an average packet delay time, and an average packet delay jitter in the at least one node.

* * * * *